Oct. 21, 1947.  R. J. BENNETT  2,429,544
TRAILER HITCH
Filed Dec. 10, 1945
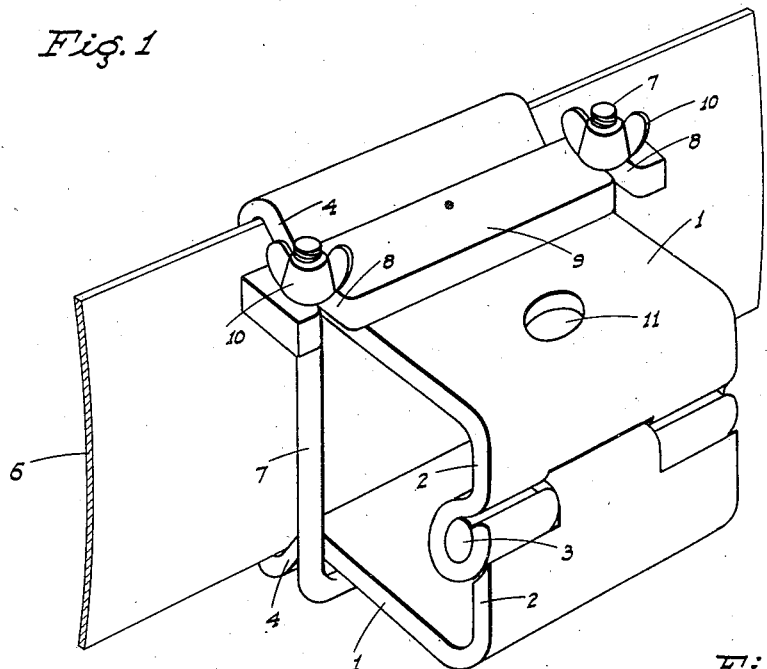
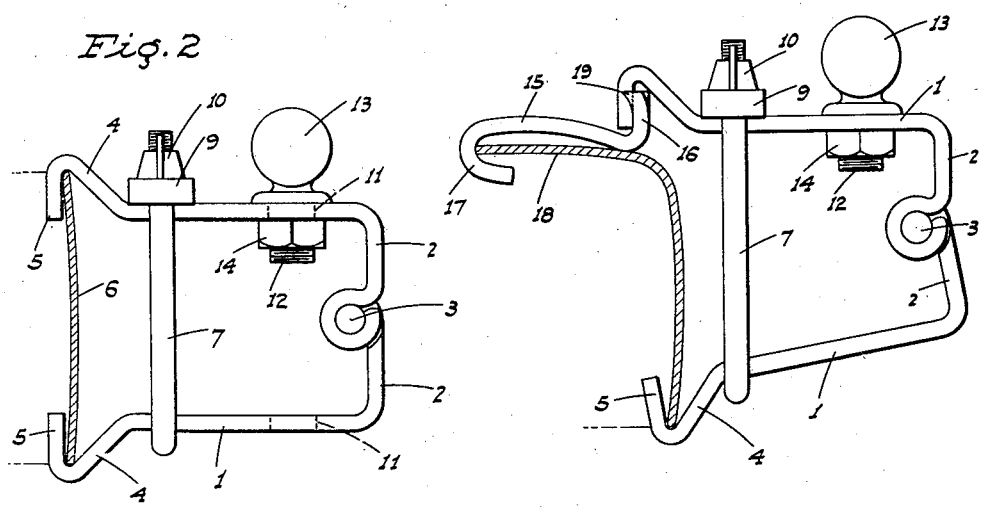
INVENTOR
R. J. Bennett
BY
ATTORNEYS Patented Oct. 21, 1947

2,429,544

UNITED STATES PATENT OFFICE 2,429,544

TRAILER HITCH

Robert J. Bennett, Pittsburgh, Pa.

Application December 10, 1945, Serial No. 633,950

4 Claims. (Cl. 280—33.44)

This invention relates in general to trailer hitches such as are used to couple a trailer to an automobile.

In particular the invention is directed to, and it is an object to provide, a novel device for attaching one member of a trailer hitch to the bumper of an automobile; such device being arranged so that it may be readily connected to or detached from the automobile bumper without the use of special tools, and without boring a hole in or otherwise defacing the bumper.

Another object of the invention is to provide an attaching device, as above, which is adjustable to fit bumpers of different vertical widths; such adjustment being accomplished through the medium of a novel arrangement including vertically spaced upper and lower plates hinged together at the rear end for vertical swinging motion and having bumper engaging hooks on the other or forward ends, said plates having clamping means connected therebetween intermediate the hinge and said hooks.

A further object of the invention is to provide a practical, simple, and inexpensive device, and yet one which will be exceedingly effective for the purpose for which it is designed.

These objects are accomplished by means of such structure and relative arrangement of parts as will fully appear by a perusal of the following specification and claims.

In the drawings similar characters of reference indicate corresponding parts in the several views:

Figure 1 is a perspective view of the device, without the hitch member thereon, as attached to an automobile bumper.

Figure 2 is a side elevation of the device as in use, and including the hitch member.

Figure 3 is a side elevation of the device in use with the adapter plate.

Referring now more particularly to the characters of reference on the drawings, and at present to Figs. 1 and 2, the device comprises a pair of vertically spaced, relatively wide attachment plates 1 adapted to extend lengthwise of the direction of travel. At their rear ends said plates are formed with right angle end flanges 2 which extend toward each other; i. e., the end flange on the top attachment plate 1 projects downwardly, while the end flange on the bottom attachment plate 1 projects upwardly. At adjacent edges the flanges are formed with a hinge 3, whereby the attachment plates 1 are connected for relative vertical adjustment.

Adjacent their forward ends the attachment plates 1 are flared vertically, as at 4, the top attachment plate 1 having the flare 4 in an upward direction, and the bottom attachment plate 1 having the flare in a downward direction. The end portions of the plate 1 and the flared portions 4 are turned toward each other to form hooks 5. As said hooks 5 face each other, they are adapted to hookingly engage over the upper and lower edges of an automobile bumper 6, in the manner clearly shown in the drawings.

As the hooks 5 are relatively wide, the device is laterally stable and when clamped in place, as hereinafter described, does not tend to rock from side to side on the bumper 6.

The attachment plate assembly, as above described, is releasably clamped to the bumper 6 by means of a U-shackle 7 which straddles said plate assembly from below and directly to the rear of the flared portions 4.

The upper end portions of the legs of the shackle 7 project through slots 8 in a cross bar 9 which rests atop the upper attachment plate 1. Wing nuts 10 are threaded on the upper ends of the legs of the shackle 7 and are adapted to be run down forcefully into engagement with the top surface of the cross bar 9. When the wing nuts 10 are tight, the attachment plates 1 are drawn together to positively engage the hooks 5 with the bumper 6, whereby to prevent escape of the attachment plate assembly therefrom.

By reason of the hinged arrangement of the attachment plates 1, and the adjustable nature of the shackle 7, the device may be readily adapted to bumpers of different vertical widths. The upper attachment plate 1 is formed, centrally of its side edges, and to the rear of the cross bar 9, with an opening 11 for the reception of the shank 12 of a ball 13 of a ball and socket type trailer hitch; there being a retaining nut 14 threaded on shank 12 so as to maintain the ball 13 in place.

For certain types of bumpers, which include a horizontal top flange, it is necessary to use an adapter plate as shown in Fig. 3. In this embodiment the device remains the same, but is used in combination with an adapter plate 15 of slightly greater width than the attachment plates 1. Such adapter plate is formed, at its rear end, with an upstanding flange 16, and at its forward end with a down-turned, rearwardly opening hook 17.

For bumpers which include a top horizontal flange 18 the adapter plate 15 is disposed on top thereof, with the upstanding flange 16 engaged by the hook 5 of the upper attachment plate 1, and with the hook 17 engaged over the forward edge of said flange 18. Ears 19 on the upstanding flange 16 lap opposite side edges of the cooperating hook 5, whereby to prevent lateral displacement of the adapter plate 15.

By use of the adapter plate 15 the hook of the upper attachment plate 1 is provided with an effective anchor to the bumper at the top.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent are desired:

1. A device for attaching a trailer hitch element to an automobile bumper, comprising a vertically spaced pair of longitudinally extending attachment members, one member being adapted to carry said hitch element, means hinging said members together at the rear end for relative vertical motion, hooks formed in facing relation on said members at the forward end, and clamping means connected between the members and adapted to urge the same toward each other; there being a longitudinally extending adapter member having an upstanding flange at its rear end adapted to be engaged by the hook on the corresponding attachment member, and a rearwardly facing, bumper engaging hook on the forward end of said adapter member.

2. A device for attaching a trailer hitch element to an automobile bumper, comprising a vertically spaced pair of longitudinally extending attachment plates disposed in spaced but facing relation, one plate being adapted to carry said hitch element, rear end flanges turned toward each other on said plates, a hinge connecting said end flanges for relative vertical motion of the plates, hooks formed in facing relation on said plates at their forward end, and clamping means connected between the plates and adapted to urge the same toward each other; there being a longitudinally extending adapter plate having an upstanding flange at its rear end adapted to be engaged by the hook on the corresponding attachment plate, and a downturned, rearwardly facing bumper engaging hook on the forward end of said adapter plate.

3. A device for attaching a trailer hitch element to an automobile bumper, comprising a vertically spaced pair of longitudinally extending attachment plates disposed in spaced but facing relation, one plate being adapted to carry said hitch element, rear end flanges turned toward each other on said plates, a hinge connecting said end flanges for relative vertical motion of the plates, bumper engaging hooks formed in facing relation on said plates at their forward end, and clamping means connected between the plates and adapted to urge the same toward each other; said clamping means comprising a U-shaped shackle straddling said plates from one to the other thereof and adjacent the hooks, a cross bar on the other plate, the legs of the yoke extending through openings in the end portions of the cross bar, and locking nuts threaded on the ends of said legs and seating against the cross bar.

4. A device as in claim 2 in which the upstanding flange on the adapter plate is formed at the ends with forwardly projecting ears arranged to lap the ends of a cooperating hook so as to prevent lateral displacement therebetween.

ROBERT J. BENNETT.

REFERENCES CITED

The following references are of record in the file of this patent:

UNITED STATES PATENTS

| Number | Name | Date |
|---|---|---|
| 1,200,107 | Heylman | Oct. 3, 1916 |
| 2,306,007 | Thorp | Dec. 22, 1942 |
| 2,347,081 | Caton | Apr. 18, 1944 |